(12) United States Patent
Enriquez et al.

(10) Patent No.: US 7,655,590 B2
(45) Date of Patent: Feb. 2, 2010

(54) ZIEGLER-NATTA CATALYST FOR PARTICLE SIZE CONTROL

(75) Inventors: Henry Enriquez, Pearland, TX (US); Kayo Vizzini, Pasadena, TX (US); Steven Gray, Bellaire, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 12/004,814

(22) Filed: Dec. 20, 2007

(65) Prior Publication Data

US 2009/0163680 A1 Jun. 25, 2009

(51) Int. Cl.
*B01J 37/16* (2006.01)
*B01J 37/22* (2006.01)

(52) U.S. Cl. ........... 502/104; 502/103; 502/132; 502/134; 502/115; 526/352; 526/123.1; 526/124.2; 526/124.3; 526/158

(58) Field of Classification Search ............ 526/352, 526/123.1, 124.2, 124.3, 158; 502/103, 115, 502/132, 134, 104
See application file for complete search history.

(56) References Cited

U.S. PATENT DOCUMENTS

| 4,657,998 | A | 4/1987 | Malpass |
| 5,817,591 | A | 10/1998 | Shamshoum |
| 5,990,251 | A | 11/1999 | Gelus |
| 6,174,971 | B1 * | 1/2001 | Chen et al. ............ 526/125.3 |
| 6,486,274 | B1 | 11/2002 | Gray |
| 6,693,058 | B1 | 2/2004 | Gray |
| 6,734,134 | B1 | 5/2004 | Gray |
| 6,864,207 | B2 | 3/2005 | Knoeppel |
| 6,916,895 | B2 | 7/2005 | Gray |
| 6,930,071 | B2 | 8/2005 | Knoeppel |
| 2004/0058802 | A1 | 3/2004 | Knoeppel |
| 2005/0209094 | A1 | 9/2005 | Knoeppel |
| 2006/0252636 | A1 | 11/2006 | Vizzini |
| 2007/0004876 | A1 | 1/2007 | Vizzini |
| 2007/0299224 | A1 | 12/2007 | Vizzini |

* cited by examiner

*Primary Examiner*—Ling-Siu Choi
(74) *Attorney, Agent, or Firm*—Tenley R. Krueger

(57) ABSTRACT

Catalyst components, methods of forming catalyst compositions, polymerization processes utilizing the catalyst compositions and polymers formed thereby are described herein. The methods generally include providing a magnesium dialkoxide compound, contacting the magnesium dialkoxide compound with a first agent to form a solution of a reaction product "$A^1$", contacting the solution of reaction product "$A^1$" with a reducing agent to form a reduced reaction product "$A^2$", contacting reduced reaction product "$A^2$" with a second agent to form a solid reaction product "$A^3$", contacting solid reaction product "$A^3$" with a metal halide to form reaction product "B" and contacting reaction product "B" with an organoaluminum compound to form a catalyst component.

14 Claims, 1 Drawing Sheet

ZIEGLER-NATTA CATALYST FOR PARTICLE SIZE CONTROL

FIELD

Embodiments of the present invention generally relate to Ziegler-Natta catalyst systems and methods of forming the same.

BACKGROUND

The properties of polymerization catalysts can affect the properties of the polymer formed using the catalyst. For example, polymer morphology and particle size distribution generally depends upon the catalyst. Good polymer morphology generally includes uniformity of particle size and shape, while minimizing the number of small polymer particles and also minimizing the formation of very large particles.

While much is known about Ziegler-Natta catalysts, there is a constant search for improvements in their polymer yield, life, activity and in their ability to produce polyolefins having certain properties.

SUMMARY

Embodiments of the present invention include methods of forming catalyst compositions and the catalyst components formed thereby. The methods generally include providing a magnesium dialkoxide compound, contacting the magnesium dialkoxide compound with a first agent to form a solution of a reaction product "$A^1$", contacting the solution of reaction product "$A^1$" with a reducing agent to form a reduced reaction product "$A^2$", contacting reduced reaction product "$A^2$" with a second agent to form a solid reaction product "$A^3$", contacting solid reaction product "$A^3$" with a metal halide to form reaction product "B" and contacting reaction product "B" with an organoaluminum compound to form a catalyst component.

One or more methods generally include sequentially contacting a magnesium dialkoxide compound with a first agent, a reducing agent, a second agent, a metal halide and an activating agent to form an active catalyst composition.

One or more embodiments further include processes for polymerizing ethylene and the polyethylene formed thereby. The processes generally include contacting ethylene monomer with a catalyst to form polyethylene, wherein the catalyst is formed by the processes described herein.

DETAILED DESCRIPTION

Introduction and Definitions

Figure 1:
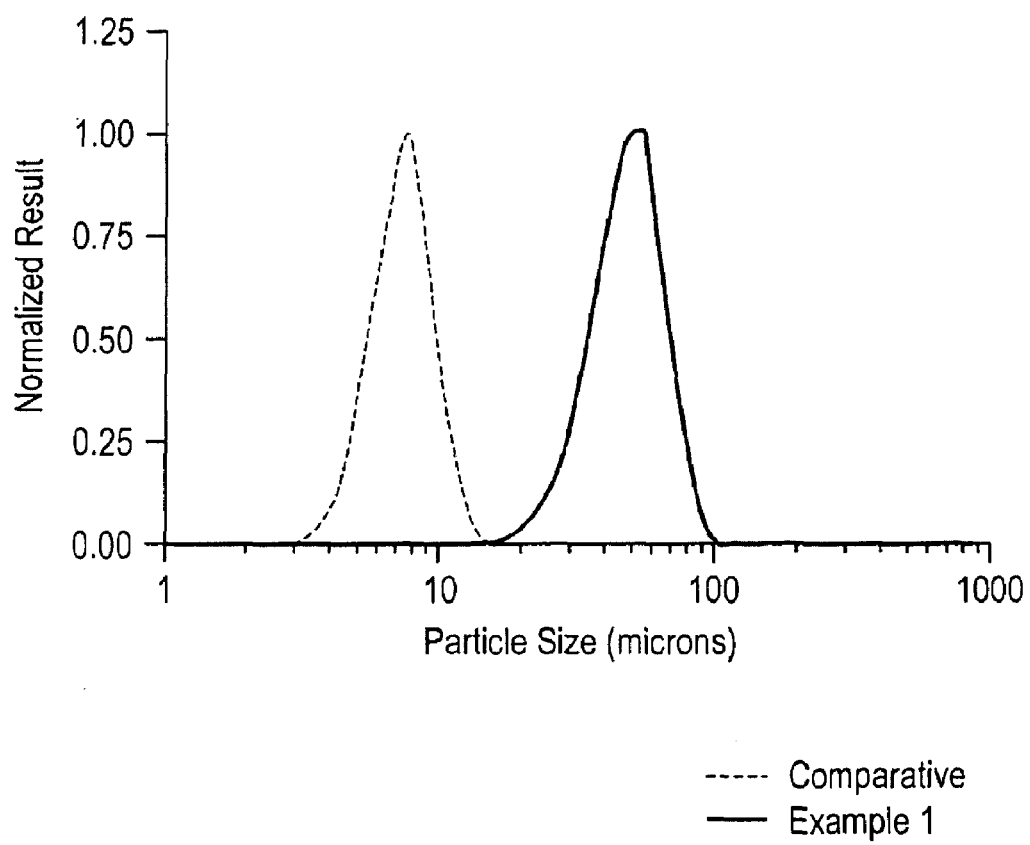
FIG. 1 illustrates the particle size distribution of catalyst samples.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

As used herein, the term "room temperature" means that a temperature difference of a few degrees does not matter to the phenomenon under investigation, such as a preparation method. In some environments, room temperature may include a temperature of from about 20° C. to about 28° C. (68° F. to 82° F.), while in other environments, room temperature may include a temperature of from about 50° F. to about 90° F., for example. However, room temperature measurements generally do not include close monitoring of the temperature of the process and therefore such a recitation does not intend to bind the embodiments described herein to any predetermined temperature range.

Catalyst Systems

Ziegler-Natta catalyst systems are generally formed from the combination of a metal component (e.g., a potentially active catalyst site) with one or more additional components, such as a catalyst support, a cocatalyst and/or one or more electron donors, for example.

A specific example of a Ziegler-Natta catalyst includes a metal component generally represented by the formula:

$$MR_x;$$

wherein M is a transition metal, R is a halogen, an alkoxy, or a hydrocarboxyl group and x is the valence of the transition metal. For example, x may be from 1 to 4.

The transition metal may be selected from Groups IV through VIB (e.g., titanium, chromium or vanadium), for example. R may be selected from chlorine, bromine, carbonate, ester, or an alkoxy group in one embodiment. Examples of catalyst components include $TiCl_4$, $TiBr_4$, $Ti(OC_4H_9)_3Cl$, $Ti(OC_4H_9)_2Cl_2$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before being useful for promoting polymerization. As discussed further below, activation may be accomplished by contacting the catalyst with an activator, which is also referred to in some instances as a "cocatalyst". Embodiments of such Z-N activators include organoaluminum compounds, such as trimethyl aluminum (TMA), triethyl aluminum (TEAl) and triisobutyl aluminum (TiBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene soluble material in the polymer. The internal electron donors may include amines, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes or combinations thereof, for example. (See, U.S. Pat. Nos. 5,945,366 and 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexylmethyldimethoxysilane (CMDS), diisopropyldimethoxysilane (DIDS) and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide or silica, for example.

Specific, non-limiting examples of formation processes for Ziegler-Natta catalysts are described in U.S. Pat. Nos. 6,734,134 and 6,174,971, which are incorporated by reference herein.

Embodiments of the invention generally include modifying the particle size of a catalyst through the reduction of species during catalyst formation. A representative, non-limiting, illustration of a possible reaction scheme for use in embodiments of the invention may be illustrated as follows:

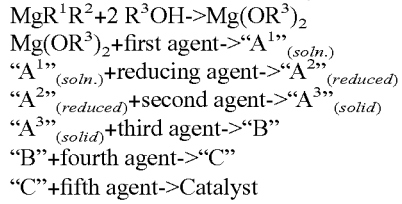

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention. For example, the third and fourth agents may be added to solid reaction product $A^3$ at the same time to form reaction product C.

As illustrated above, embodiments of the invention include methods of forming Ziegler-Natta catalysts. The methods generally include the formation and/or providing of a magnesium dialkoxide compound. The magnesium dialkoxide compound may be formed by contacting a magnesium containing compound with an alcohol to form the magnesium dialkoxide compound. In one or more embodiments, this reaction is conducted at a reaction temperature of from room temperature to about 90° C. or from room temperature to about 85° C. for a time of up to about 10 hours, for example.

The alcohol may be added to the magnesium containing compound in an equivalent of from about 0.5 to about 6 or from about 1 to about 3, for example.

The magnesium containing compound may be represented by the formula:

$$MgR^1R^2;$$

wherein $R^1$ and $R^2$ are independently selected from $C_1$ to $C_{10}$ alkyl groups. Non-limiting illustrations of magnesium containing compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols include butanol, isobutanol and 2-ethylhexanol, for example.

The method then includes contacting the magnesium dialkoxide compound with a first agent to form a reaction product "$A^1$". The resulting reaction product "$A^1$" is a solution product. As used herein, "solution" refers to homogenous mixture of two or more compounds.

This reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon. Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

In one or more embodiments, this reaction is conducted at a temperature of from about 0° C. to about 100° C. or from about 20° C. to about 90° C. for a time of from about 0.2 hours to about 24 hours or from about 1 hour to about 4 hours, for example.

A non-limiting example of the first agent is represented by the formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide (ClTi(O$^i$Pr)$_3$) and ClSi(Me)$_3$, for example.

The method then includes reducing the solution of reaction product "$A^1$" to form a reduced reaction product "$A^2$". It has been observed that such reduction of "$A^1$" results in a catalyst having a larger particle size distribution than methods not including the reduction of solution "$A^1$". For example, the catalyst generally has a particle size (as measured by $D_{50}$) of at least 5 microns, or at least 10 microns or at least 20 microns, for example. In one or more embodiments, the catalyst of the embodiments has a particle size that is at least about 100%, or at least 120% or at least 200% greater than an identical catalyst absent the reduction.

In one embodiment, reaction product "$A^1$" is reduced by contacting the solution of "$A^1$" with a reducing agent. The reducing agent may include an organoaluminum compound, organolithium compound and organomagnesium compound, for example.

In one, non-limiting embodiment, the organoaluminum compound is represented by the formula:

$$AlR^5_3;$$

wherein $R^5$ is a $C_1$ to $C_{10}$ alkyl compound. Non-limiting illustrations of the aluminum alkyl compounds generally include trimethyl alumimum (TMA), triisobutyl aluminum (TIBAl), triethyl aluminum (TEAl), n-octyl aluminum and n-hexyl aluminum, for example. In one specific embodiment, the reducing agent includes TEAl.

Reaction product "$A^1$" is generally contacted with an amount of reducing agent sufficient to reduce reaction product "$A^1$". For example, the reducing agent may contact reaction product "$A^1$" in an equivalent of from about 0.1:1 to about 1:1 or from about 0.15:1 to about 0.5:1, for example.

It is to be noted that the reduction to form reaction product "$A^2$" is described in one or more embodiments as contacting reaction product "$A^1$" with the reducing agent. However, it is contemplated that the reducing agent may contact the magnesium containing compound, the magnesium dialkoxide compound, reaction product "$A^1$" or combinations thereof to reduce reaction product "$A^1$" and form reaction product "$A^2$" as described herein.

In one or more embodiments, this reaction is conducted at a temperature of from about 0° C. to about 100° C. or from about 20° C. to about 90° C. for a time of from about 0.2 hours to about 24 hours or from about 1 hour to about 4 hours, for example.

The method then includes contacting reduced reaction product "$A^2$" with a second agent to form a solid reaction product "$A^3$". This reaction may occur in the presence of an inert solvent. The inert solvents may include any of those solvents previously discussed herein, for example.

In one or more embodiments, this reaction is conducted at a temperature of from about 0° C. to about 100° C. or from about 20° C. to about 90° C. for a time of from about 0.2 hours to about 36 hours or from about 1 hour to about 4 hours, for example.

The second agent may be added to solid reaction product "$A^2$" in an amount sufficient to precipitate reaction product "$A^3$" out of solution. For example, the second agent may contact solid reaction product "$A^2$" in an equivalent of from about 0.5 to about 5, or from about 1 to about 4 or from about 1.5 to about 2.5, for example.

The second agent may be represented by the formula:

$$TiCl_4/Ti(OR^6)_4;$$

wherein $R^6$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^6)_4$ of from about 0.5 to about 6 or from about 2 to about 3, for example.

The method may then include contacting solid reaction product "$A^3$" with a third agent to form reaction product "B". This reaction may occur in the presence of an inert solvent, for example. The inert solvents may include any of those solvents previously discussed herein, for example. Further, in one or more embodiments, the reaction is conducted at room temperature.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 2.5, for example.

The method may further include contacting reaction product "B" with a fourth agent to form reaction product "C". This reaction may occur in the presence of an inert solvent, for example. The inert solvents may include any of those solvents previously discussed herein, for example. In one or more embodiments, the reaction is conducted at room temperature.

The fourth agent may be added to the reaction product "B" in an equivalent of from about 0.1 to about 5, or from about 0.25 to about 4 or from about 0.45 to about 2.0, for example.

Non-limiting illustrations of fourth agents include metal halides. The metal halides may include any metal halide previously described herein, for example.

The method may then include contacting reaction product "C" with a fifth agent to form the Ziegler-Natta catalyst component.

The fifth agent may be added to the reaction product "C" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^7_3;$$

wherein $R^7$ is a $C_1$ to $C_{10}$ alkyl compound. Non-limiting illustrations of the aluminum alkyl compounds generally include trimethyl alumimum (TMA), triisobutyl aluminum (TIBAl), triethyl aluminum (TEAl), n-octyl aluminum and n-hexyl aluminum, for example.

It is to be noted that although one or more of the reaction products may be contacted with organoaluminum compounds, thereby potentially "activating" the reaction product, it is believed that the Ziegler-Natta catalyst component does not exhibit "commercially viable" activity for subsequent polymerization until contact with (at least) the third agent. As used herein, the term "activating" refers to a process wherein a catalyst component (and/or reaction product) is capable of producing a polymer product in a polymerization process. As used herein, the term "commercially viable activity" refers to an activity of at least 5,000 g/g/hour, or at least 7,500 g/g/hr, or at least about 10,000 g/g/hr, or at least about 15,000 g/g/hr or at least about 17,000 g/g/hr, for example. The term "activity" refers to the weight of product produced per weight of the catalyst used in a process at a standard set of conditions per unit time.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678; 6,420, 580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include polyethylene.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

EXAMPLES

Comparative Example

The preparation of the comparative catalyst was achieved by slurrying 100 mmol (54.7 g) of butyl ethyl magnesium (BEM) (20.2 wt %, 0.12 wt % Al) in hexane (total volume 100 ml) and stirring (250 rpm) the mixture at room temperature. In addition, 206 mmol (27.0 g) of ethyl hexanol (EHOH) was diluted in 50 mL of hexane and the resulting solution was added drop wise to the BEM solution at room temperature over 30 minutes. The reaction mixture was then stirred at room temperature for another hour.

The preparation then included adding 100 mmol (45.0 g) of $ClTi(O^iPr)_3$ (2M in hexane) to the mixture at room temperature over 30 minutes. A clear, solid free solution "A" was obtained. The reaction solution "A" was then stirred at room temperature for 30 minutes.

In addition, 100 mmol (34.4 g) of tetra n-butyl titanate (TNBT) and 150 mL of hexane were added to a 250 mL graduated cylinder. 200 mmol (37.04 g) of $TiCl_4$ was then added drop wise to the TNBT mixture at room temperature over 10 minutes to form $2TiCl_4/Ti(OBu)_4$. Hexane was then added to the mixture to provide a mixture volume of 250 mL. The resulting mixture was then allowed to set over 4 hours.

The preparation then included adding the $2TiCl_4/Ti(OBu)_4$ drop wise to the reaction solution "A" at room temperature over 1.5 hours to form reaction solid mixture "A". The reaction solid mixture "A" was then stirred at room temperature for another hour. The supernatant was then decanted and the resulting solids were washed three times with 200 mL of hexane. The solids were then suspended in 200 mL of hexane.

The preparation then included adding 100 mmol (19.0 g) of TiCl$_4$ (diluted to 50 mL in hexane) drop wise to the reaction solid mixture "A" at room temperature over 20 minutes to form reaction mixture "B". The reaction mixture "B" was then stirred at room temperature for another hour. The supernatant was then decanted and the solids were washed with 200 mL of hexane. The solids were then suspended in 200 mL of hexane.

The preparation then included adding 100 mmol (19.0 g) of TiCl$_4$ (diluted to 50 mL in hexane) drop wise to the reaction mixture "B" at room temperature over 20 minutes to form reaction mixture "C". The reaction mixture "C" was then stirred at room temperature for another hour. The supernatant was then decanted and the solids were washed three times with 200 mL of hexane. The solids were then suspended in 150 ml of hexane.

The preparation then included adding 15.6 mmol (7.13 g) of TEAl (25 wt. %) to the reaction mixture "D" at room temperature over 25 minutes to form the catalyst. The catalyst was then stirred at room temperature for another hour.

Example 1

The preparation of Catalyst 1 was achieved by slurrying 100 mmol (54.7 g) of BEM (20.2 wt %, 0.12 wt % Al) in hexane (total volume 100 ml) and stirring (250 rpm) the mixture at room temperature. In addition, 206 mmol (27.0 g) of EHOH was diluted in 50 mL of hexane and the resulting solution was added drop wise to the BEM solution at room temperature over 30 minutes. The reaction mixture was then stirred at room temperature for another hour.

The preparation then included adding 100 mmol (45.0 g) of ClTi(O$^i$Pr)$_3$ (2M in hexane) to the mixture at room temperature over 30 minutes. A clear, solid free solution "A" was obtained. The reaction solution "A" was then stirred at room temperature for 30 minutes.

7.45 g of 25 wt. % TEAl (0.165 equivalent to BEM) was diluted to 25 mL with hexane. This clear liquid was transferred to solution "A" over 20 minutes. The reaction was allowed to stir for 30 minutes.

In addition, 100 mmol (34.4 g) of TNBT and 150 mL of hexane were added to a 250 mL graduated cylinder. 200 mmol (37.04 g) of TiCl$_4$ was then added drop wise to the TNBT mixture at room temperature over 10 minutes to form 2TiCl$_4$/Ti(OBu)$_4$. Hexane was then added to the mixture to provide a mixture volume of 250 mL. The resulting mixture was then allowed to set over 4 hours.

The preparation then included adding the 2TiCl$_4$/Ti(OBu)$_4$ drop wise to the reaction reduced solution "A" at room temperature over 1.5 hours to form reaction solid mixture "A". The reaction solid mixture "A" was then stirred at room temperature for another hour. The Supernatant was then decanted and the resulting solids were washed three times with 200 mL of hexane. The solids were then suspended in 200 mL of hexane.

The preparation then included adding 100 mmol (19.0 g) of TiCl$_4$ (diluted to 50 mL in hexane) drop wise to the reaction solid mixture "A" at room temperature over 20 minutes to form reaction solid mixture "B". The reaction solid mixture "B" was then stirred at room temperature for another hour. The supernatant was then decanted and the solids were washed with 200 mL of hexane. The solids were then suspended in 200 mL of hexane.

The preparation then included adding 100 mmol (19.0 g) of TiCl$_4$ (diluted to 50 mL in hexane) drop wise to the reaction solid mixture "B" at room temperature over 20 minutes to form reaction solid mixture "C". The reaction mixture "C" was then stirred at room temperature for another hour. The supernatant was then decanted and the solids were washed three times with 200 mL of hexane. The solids were then suspended in 150 ml of hexane.

The preparation then included adding 15.6 mmol (7.13 g) of TEAl (25 wt. %) to the reaction mixture "C" at room temperature over 25 minutes to form the catalyst. The catalyst was then stirred at room temperature for another hour.

It was observed that Catalyst 1 had a significantly larger particle size than the comparative catalyst. See, FIG. 1.

The resulting catalysts were then exposed to polymerization at 80° C., 125 psig, 0.25 mmol/L TIBAl cocatalyst, 1 h with ethylene monomer to form polyethylene. The results of such polymerizations follow in Table 1.

TABLE 1

| Catalyst | Comparative | Example 1 |
|---|---|---|
| Catalyst D$_{50}$ (μ) | 7 | 40 |
| Mg Activity (g/g/h) | 29,400 | 19,300 |
| Polymer Bulk Density (g/mL) | 0.44 | 0.38 |
| MI$_2$ (dg/min) | 0.55 | 0.56 |
| MI$_5$ (dg/min) | 1.68 | 1.87 |
| SR$_2$ | 37 | 40 |
| SR$_5$ | 12 | 12 |
| Resin Density (g/mL) | 0.9606 | 0.956 |
| Wax (%) | 0.4 | 0.9 |
| Mn | 19,301 | 21,226 |
| Mw | 148,744 | 175,521 |
| Mz | 822,809 | 1,022,391 |
| Mn/Mw | 7.7 | 8.3 |

*D$_{50}$ was measured by Malvern, density was measured by ASTM D1238, wax was extracted with Soxtec Avanti Extraction Unit with cyclohexane, MI$_2$ and MI$_5$ was measured by ASTM D1238E, SR$_2$ was measured by HLMI/MI$_2$ and SR$_5$ was measured by HLMI/MI$_5$ (5.0 kg, 21.6 kg and 2.16 kg at a temperature of 190° C.)

It was observed that the properties of the polymers formed from both catalysts were comparable.

While the foregoing is directed to embodiments of the present invention, other and further embodiments of the invention may be devised without departing from the basic scope thereof and the scope thereof is determined by the claims that follow.

What is claimed is:

1. A method of forming a catalyst comprising:
providing a magnesium dialkoxide compound;
contacting the magnesium dialkoxide compound with a first agent to form a solution of a reaction product "A$^1$";
contacting the solution of reaction product "A$^1$" with a reducing agent to form a reduced reaction product "A$^2$";
contacting reduced reaction product "A$^2$" with a second agent to form a solid reaction product "A$^3$";
contacting solid reaction product "A$^3$" with a metal halide to form reaction product "B"; and
contacting reaction product "B" with an organoaluminum compound to form a catalyst component.

2. The method of claim 1, wherein the providing a magnesium dialkoxide compound comprises contacting a magnesium containing compound with an alcohol to form the magnesium dialkoxide compound.

3. The method of claim 2, wherein the magnesium containing compound is selected from butyl ethyl magnesium, diethyl magnesiam, dipropyl magnesium, dibutyl magnesium and combinations thereof.

4. The method of claim 2, wherein the alcohol is selected from butanol, isobutanol, 2-ethyl hexanol and combinations thereof.

5. The method of claim 1, wherein the first agent is represented by the formula:

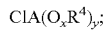

wherein A is selected from titanium, silicon, aluminum, carbon, tin and germanium, $R^4$ is selected from $C_1$ to $C_{10}$ alkyls, x is 0 or 1 and y is the valence of A minus 1.

6. The method of claim 1, wherein the first agent comprises chlorotitaniumtriisopropoxide.

7. The method of claim 1, wherein the reducing agent is selected from an organolithoum compound, an organomagnesium compound, an organoaluminum compound and combinations thereof.

8. The method of claim 1, wherein the reducing agent comprises triethyl aluminum.

9. The method of claim 1, wherein the reducing agent contacts reaction product "$A^1$" in an equivalent of from about 0.1:1 to about 1:1.

10. The method of claim 1, wherein the second agent is represented by the formula:

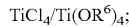

wherein $R^6$ is selected from $C_2$ to $C_{20}$ alkyl groups.

11. The method of claim 1, wherein the second agent comprises $TiCl_4/Ti(OBu)_4$.

12. A catalyst component formed by the method of claim 1.

13. The catalyst component of claim 12 further comprising a particle size of at least about 20 microns.

14. A process for polymerizing ethylene comprising;
contacting ethylene monomer with a catalyst to form polyethylene, wherein the catalyst is formed by a process comprising:
providing a magnesium dialkoxide compound;
contacting the magnesium dialkoxide compound with a first agent to form a solution of a reaction product "$A^1$";
contacting the solution of reaction product "$A^1$" with a reducing agent to form a reduced reaction product "$A^2$";
contacting reduced reaction product "$A^2$" with a second agent to form a solid reaction product "$A^3$";
contacting solid reaction product "$A^3$" with a metal halide to form a reaction product "B"; and
contacting reaction product "B" with an organoaluminum compound to form a catalyst component.

\* \* \* \* \*